United States Patent
Bechtel et al.

(10) Patent No.: US 11,432,535 B2
(45) Date of Patent: Sep. 6, 2022

(54) CRITTER-PROOF BIRD FEEDER APPARATUS

(71) Applicants: Paul L. Bechtel, Austin, TX (US); Matthew Bechtel, Austin, TX (US)

(72) Inventors: Paul L. Bechtel, Austin, TX (US); Matthew Bechtel, Austin, TX (US)

(*) Notice: Subject to any disclaimer, the term of this patent is extended or adjusted under 35 U.S.C. 154(b) by 152 days.

(21) Appl. No.: 16/735,663

(22) Filed: Jan. 6, 2020

(65) Prior Publication Data

US 2020/0214271 A1  Jul. 9, 2020

(51) Int. Cl.
*A01K 39/01* (2006.01)
*A01K 39/012* (2006.01)

(52) U.S. Cl.
CPC ........ *A01K 39/0113* (2013.01); *A01K 39/012* (2013.01)

(58) Field of Classification Search
CPC ..................................... A01K 9/0113
USPC ............................... 119/52.2–61.3
See application file for complete search history.

(56) References Cited

U.S. PATENT DOCUMENTS

| | | | | |
|---|---|---|---|---|
| 4,441,458 A * | 4/1984 | Mercil | ............... | A01K 39/0206 119/51.5 |
| 4,523,546 A * | 6/1985 | Latham | ............... | A01K 39/0113 119/57.9 |
| 5,289,796 A * | 3/1994 | Armstrong | ........... | A01K 39/012 119/52.3 |
| 5,291,855 A * | 3/1994 | Laverty | ............... | A01K 39/0113 119/52.3 |
| 5,642,687 A * | 7/1997 | Nylen | ................. | A01K 39/0113 119/52.3 |
| 5,829,383 A * | 11/1998 | Blanding | ............. | A01K 39/012 119/52.3 |
| 5,829,384 A * | 11/1998 | Landry | ............... | A01K 39/0113 119/52.3 |
| 6,561,128 B1 * | 5/2003 | Carter | ................. | A01K 39/0113 119/52.3 |
| 6,604,487 B2 * | 8/2003 | Lush | ................... | A01K 39/0113 119/57.9 |
| 6,918,353 B1 * | 7/2005 | Coroneos | ........... | A01K 39/0113 119/52.3 |
| 7,011,040 B2 * | 3/2006 | Marshall | ............ | A01K 39/0113 119/57.9 |
| 7,171,921 B1 * | 2/2007 | Lush | ................... | A01K 39/0113 119/57.9 |

(Continued)

*Primary Examiner* — Yvonne R Abbott-Lewis
(74) *Attorney, Agent, or Firm* — Isidore PLLC

(57) ABSTRACT

A critter-proof bird feed apparatus includes a critter deterrent barrier/deflector assembly that attaches to the top of a bird feeder and prevents critters from accessing the bird feeder when the combined apparatus is hung up. The critter deterrent barrier/deflector assembly includes a connecting cable having a first end attached to the bird feeder and a second end for attaching to a pole, bracket, or other support structure above. The critter deterrent barrier/deflector assembly includes a deflector plate that extends in a lateral/horizontal direction. The deflector plate has a larger width than the bird feeder and block a view of the bird feeder from above the deflector plate. The critter deterrent barrier/deflector assembly includes a plurality of inverted, overlapping cones extending above the deflector plate, and preventing a critter from gripping onto the cones.

17 Claims, 11 Drawing Sheets

(56) References Cited

U.S. PATENT DOCUMENTS

| | | | |
|---|---|---|---|
| 7,861,670 B2 * | 1/2011 | Berns | A01K 39/012 119/52.3 |
| 8,413,605 B2 * | 4/2013 | Baynard | A01K 39/0206 119/52.3 |
| 10,455,818 B2 * | 10/2019 | Cote | A01K 39/012 |
| 2003/0033985 A1 * | 2/2003 | Hardison | A01K 39/00 119/57.9 |
| 2005/0263083 A1 * | 12/2005 | Coroneos | A01K 39/0113 119/57.1 |

* cited by examiner

FIG. 8

```
                    ┌─ START ─┐
                         │
                         ▼
```

800

Providing a connector capable of extending vertically above a bird feeder, with a first end proximate to and attached to a top of the bird feeder and a second end configured as a loop for attaching to a pole, bracket, or other support structure immediately above a bird feeder
802

Incorporating a frayed wired to at least an exposed top portion of the connector, the frayed wire being of sufficient tensile strength to hold the bird feeder and attached critter barrier/deflector assembly while extended from above by the connector, the frayed wire being sufficiently hard to prevent the wire from being chewed through by the critters.
812

Providing a critter barrier/deflector assembly that extends along a portion of the connector between the top of the bird feeder and the second end of the connector, the critter barrier/deflector preventing critters from being able to gain access to the base plate and the feed within the bird feeder.
804

Providing a deflector plate and attaching the deflector plate to the connector such that the deflector plate extends perpendicular to the top surface of the bird feeder, the deflector plate having a larger width than and extending laterally past the exterior walls of the bird feeder in each lateral direction, the deflector plate blocking a view of the bird feeder from above the deflector plate.
806

Providing a plurality of cones and attaching the plurality of cones to the connector such that the inverted cones extend above the deflector plate, each adjacent pair of cones having a lower, open portion of an upper cone overlapping a top portion of a body of a lower cone.
808

Providing a plurality of balls and attaching the plurality of spherical balls to the connector such that the plurality of spherical balls extends from a topmost inverted cone upwards to the loop of the connector, the plurality of balls having through holes, with a segment of the connector extended there-through.
810

Providing a bird feeder having a hollow volumetric container within which feed can be placed for dispensing
814

Manufacturing the volumetric container with an open inverted conical shaped cylinder of gradually decreasing circumference from top to bottom, with a top of the volumetric container having a larger circumference than the bottom of the volumetric container that is closest to the feed dispensing tray.
816

END

CRITTER-PROOF BIRD FEEDER APPARATUS

RELATED APPLICATION

This application claims priority to U.S. provisional application No. 62/788,826, filed Jan. 5, 2019, the content of which is fully incorporated herein by reference.

BACKGROUND OF THE INVENTION

1. Technical Field

The present invention relates in general to an apparatus to which a hanging bird feeder is attached and which is designed to prevent critters from accessing the feeder and consuming the food in the bird feeder.

2. Description of the Related Art

Bird feeders are widely utilized by humans who wish to attract birds to a particular area by providing food (e.g., grains, etc.) within an outdoor hanging structure. Bird feeders are typically constructed as hollow structures with holes or other apertures that allow the stored food (or feed) to be distributed through the open holes to an exterior base on which the birds are able to perch while consuming the food being dispensed. Most bird feeders are tied to and hang from a tree branch or other vertical structure that allows the feeder to be above ground. The goal of the feeder is to allow for slow dispensing of feed over a long period of time, typically several days or longer. The person supplying the feed is thus able to attract birds to the area and enjoy watching the birds for that period of time without having to constantly replenish the feeder.

Unfortunately, the feed being provided to birds is also eaten by critters, such as squirrels and racoons and other rodents. These critters indiscriminately eat, in a single setting, much of or the entire stored stash of grain intended to be consumed over the much longer period by the birds. These critters are also very capable of climbing and jumping horizontally from an adjacent tree limb onto the bird feeder. The critters also can simply utilize their agility and climbing skills to climb down the rope from the tree limb and access the feeder from above.

As one deterrent to the ground attack by critters, the bird feeder can be hoisted high enough above the ground where the critter is not able to jump vertically up to the feeder. However, squirrels, for example, are very agile and capable of jumping across large expanses of open spaces, such as from a tree limb onto a hanging bird feeder located high off the ground and far from the tree limb.

Several different approaches have been taken in the design of bird feeders in an attempt to solve the aforementioned problem. Some designs provide a weight spring that causes the feeder apertures to be closed when a larger weight critter perches on the feeding plate. However, most of these designs are complex and expensive to implement, requiring mechanical moving parts. The bird feeders than incorporate these designs are significantly more costly and are also susceptible to failing due to the incorporation of mechanical moving parts. Thus, existing bird feeders are either ineffective in keeping the critters out or are expensive to manufacture and thus costly to the consumer.

SUMMARY

Disclosed are a plurality of configurations of critter-proof bird feed apparatuses and a method for constructing or manufacturing critter-proof bird feed apparatuses that effectively prevents critters, such as squirrels and racoons, from being able to gain access to an associated bird feeder when the bird feeder is installed in the field with the apparatus attached.

According to one aspect, a critter-proof bird feed apparatus includes a critter deterrent barrier/deflector assembly configured to attach to a top surface of a bird feeder and extend vertically upwards above the bird feeder. The critter deterrent barrier/deflector assembly includes a connecting cable having a first end, proximate to a top of the bird feeder, attached via an attachment mechanism or knot to the connection mechanism and a second end for attaching to a pole, bracket, or other support structure immediately above the critter deterrent barrier/deflector assembly. The critter deterrent barrier/deflector assembly also includes a deflector plate that extends perpendicular to the top surface of the bird feeder housing assembly, the deflector plate having a larger circumference/width than and extending laterally past an exterior edge of the bird feeder in each lateral direction. The deflector plate blocks a view of the bird feeder from above the deflector plate. The critter deterrent barrier/deflector assembly also includes a plurality of cones extending above the deflector plate, each adjacent pair of cones having a lower, open portion of an upper cone overlapping a top portion of a body of a lower cone.

According to one embodiment, the critter deterrent barrier/deflector assembly further includes a plurality of spherical balls extending from a topmost cone upwards to the loop of the connecting cable, the plurality of spherical balls having through holes, with the connecting cable extended there-through. The connecting cable used has sufficient tensile strength to hold a weight of the critter-proof bird feed apparatus concurrently with a combined weight of the bird feeder, a number of birds perched on the bird feed housing assembly, and one or more critters, while the critter-proof bird feed apparatus is extended from above via the connecting cable attached to an upper support. The critter deterrent barrier/deflector assembly effectively prevents critters from being able to gain access to the bird feeder when the critter-proof bird feed apparatus is hung up at a height above ground that is higher than a jumping height of the critter.

In one embodiment, the connecting cable comprises multiple interconnected segments, with a segment extending from the topmost cone being made of a wire having sufficient hardness to withstand chewing thereon by one or more critters. Further, in one embodiment, an end of the wire is configured as a loop for short-hanging the bird feed apparatus. With this embodiment, the connecting cable can include a wire extension (i.e., a second wire) coupled to the loop and extending upwards away from the bird feeder apparatus for attaching to a higher supporting structure, located vertically above the bird feeder apparatus or for extending around a tree limb or other upper support and down to another structure to which the wire extension is tied/attached.

According to one embodiment, a completely-assembled critter-proof bird feeder apparatus includes the bird feeder, which is attached below the deflector plate of the critter deterrent barrier/deflector assembly. The bird feeder includes a volumetric enclosure for holding a supply of feed, the enclosure have exterior walls and one or more apertures at a bottom section through which a portion of the feed exits the enclosure. The bird feeder also includes a feed dispensing tray attached to a bottom of the volumetric enclosure as a base plate, the feed dispensing tray presenting a surface to the outside of the bird feeder assembly on which the portion of the feed exiting the enclosure through the apertures is exposed for consumption. The bird feeder also includes a cover component fixably attached to a top of the volumetric enclosure and having a connection mechanism attached to a top surface for receiving a connecting cable. In one embodiment, the side walls of the bird feeder is designed as an open conical shaped cylinder of gradually decreasing circumference from top to bottom, with a top of the volumetric enclosure having a larger circumference than the bottom of the volumetric enclosure closest to the feed dispensing tray. The inverted conical shape prevents critters from being able to grab onto an exterior surface of the bird feeder housing when the critters attempt to jump onto and hold on to the bird feeder housing.

According to another aspect, a critter-proof bird feed apparatus includes a bird feeder, and a connecting cable extending vertically above the bird feeder, with a first end, proximate to and attached to a top of the bird feeder and a second end for attaching to a pole, bracket, or other support structure immediately above the bird feeder assembly, and a critter barrier/deflector assembly extending along a portion of the connecting cable between the top of the bird feeder and the second end of the connecting cable, the critter barrier/deflector preventing critters from being able to gain access to the base plate and the feed within the bird feeder. The critter barrier/deflector assembly includes a deflector plate that extends perpendicular to the top surface of the bird feeder, the deflector plate having a larger width than and extending laterally past a width of the bird feeder in each lateral direction, the deflector plate blocking a view of the bird feeder from above the deflector plate. The critter barrier/deflector assembly also includes a plurality of cones extending above the deflector plate, each adjacent pair of cones having a lower, open portion of an upper cone overlapping a top portion of a body of a lower cone;

The bird feeder includes: (i) a hollow volumetric container within which feed can be placed for dispensing, the volumetric container having an exterior wall with one or more dispensing apertures presented therein; (ii) a base plate that extends to allow one or more birds to perch thereon, the base plate or tray providing a surface for dispersing the feed from the one or more apertures; and (iii) a removable cover for exposing a hollow interior of the bird feeder to enable insertion of the feed and to securely attach to a top of the volumetric container to protect the feed from exposure to rain and other environmental elements, and from access from the top of the volumetric container. In one embodiment, the volumetric container includes an inverted, open conical-shaped cylinder of gradually decreasing circumference from top to bottom, with a top of the volumetric container having a larger circumference than the bottom of the volumetric container that is closest to the feed dispensing tray. The conical shape prevents critters from being able to grab onto an exterior surface of the bird feeder when the critters attempt to jump onto and hold on to the bird feeder.

According to yet another aspect of the disclosure, a method for manufacturing a critter-proof bird feeder apparatus includes (i) providing a connecting cable capable of extending vertically above a bird feeder, with a first end proximate to and attached to a top of the bird feeder and a second end configured as a loop for attaching to a pole, bracket, or other support structure immediately above the bird feeder assembly, and (ii) providing a critter barrier/deflector assembly that extends along a portion of the connecting cable between the top of the bird feeder and the second end of the connecting cable, the critter barrier/deflector preventing critters from being able to gain access to the base plate and the feed within the bird feeder.

According to one embodiment, providing the critter barrier/deflector assembly includes: providing a deflector plate and attaching the deflector plate to the connecting cable such that the deflector plate extends perpendicular to the top surface of the bird feeder, the deflector plate having a larger width than and extending laterally past a width of the bird feeder in each lateral direction, the deflector plate blocking a view of the bird feeder from above the deflector plate. Providing the critter barrier/deflector assembly also includes providing a plurality of cones and attaching the plurality of cones to the connecting cable such that the cones extend above the deflector plate, each adjacent pair of cones having a lower, open portion of an upper cone overlapping a top portion of a body of a lower cone.

In one embodiment, providing the critter barrier/deflector assembly further includes providing a plurality of spherical balls and attaching the plurality of spherical balls to the connecting cable such that the plurality of spherical balls extends from a topmost cone upwards to the loop of the connecting cable, the plurality of spherical balls having through holes, with a segment of the connecting cable extended there-through.

In one embodiment, in providing the connecting cable, the method includes incorporating a frayed wired to at least an exposed top portion of the connecting cable, the frayed wire being of sufficient tensile strength to hold the bird feeder and attached critter barrier/deflector assembly while extended from above by the connecting cable, the frayed wire being sufficiently hard to prevent the wire from being chewed through by the critters.

The method further includes providing a bird feeder having: (i) a hollow volumetric container within which feed can be placed for dispensing, the volumetric container having an exterior wall with one or more dispensing apertures presented therein; (ii) a base plate that extends to allow one or more birds to perch thereon, the base plate or tray providing a surface for dispersing the feed from the one or more apertures; and (iii) a removable cover for exposing a hollow interior of the bird feeder to enable insertion of the feed and to securely attach to a top of the volumetric container to protect the feed from exposure to rain and other environmental elements, and from access from the top of the volumetric container. According to one embodiment, providing the bird feeder includes manufacturing the bird feeder with the volumetric container including an open inverted conical shaped cylinder of gradually decreasing circumference from top to bottom, with a top of the volumetric container having a larger circumference than the bottom of the volumetric container that is closest to the feed dispensing tray. The inverted conical shape prevents critters from being able to grab onto an exterior surface of the bird feeder housing when the critters attempt to jump onto and hold on to the bird feeder housing.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description. The above as well as additional objectives, features, and advantages of the present invention will become apparent in the following detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 8 is a flow chart illustrating a method for manufacturing and packaging a critter deterrent barrier/deflector assembly of a critter-proof bird feed apparatus, according to one or more embodiments.

DETAILED DESCRIPTION OF AN ILLUSTRATIVE EMBODIMENT

Disclosed are a plurality of different configurations of critter-proof bird feeder apparatuses and a method for constructing or manufacturing critter-proof bird feed apparatuses that effectively prevents critters, such as squirrels and racoons, from being able to access the associated bird feeder when installed in the field. The critter-proof bird feed apparatus includes a critter deterrent barrier/deflector assembly that attaches to the top of a bird feeder and prevents critters from accessing the bird feeder when the combined apparatus is hung up. The critter deterrent barrier/deflector assembly includes a connecting cable having a first end attached to the bird feeder and a second end for attaching to a pole, bracket, or other support structure above. The critter deterrent barrier/deflector assembly includes a deflector plate that extends in a lateral/horizontal direction. The deflector plate has a larger width than the bird feeder and block a view of the bird feeder from above the deflector plate. The critter deterrent barrier/deflector assembly includes a plurality of inverted, overlapping cones extending above the deflector plate, and preventing a critter from gripping onto the cones.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Figure 1A:
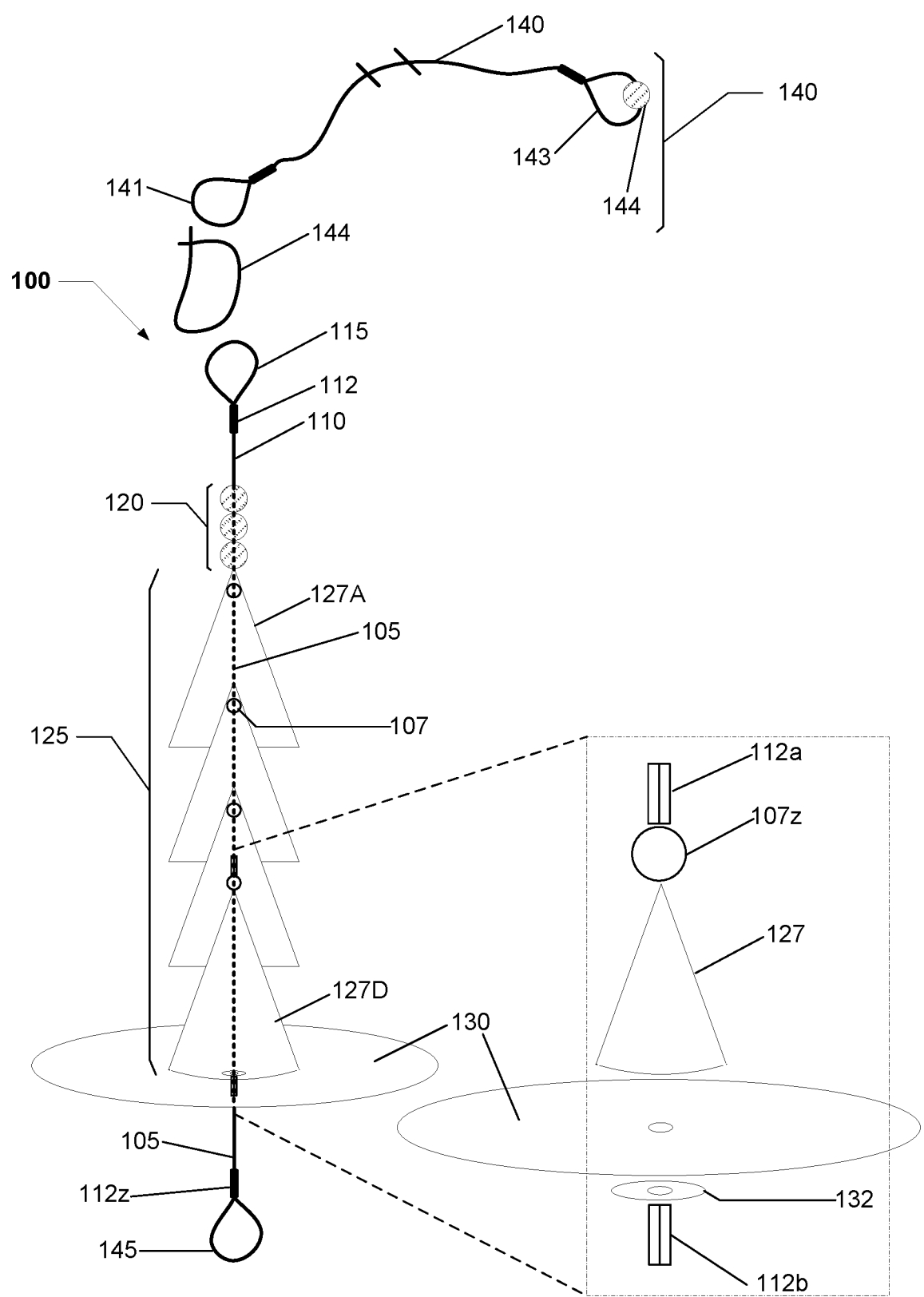
FIG. 1A illustrates an example critter deterrent barrier/deflector assembly, in accordance with one or more embodiments.
Figure 1B:
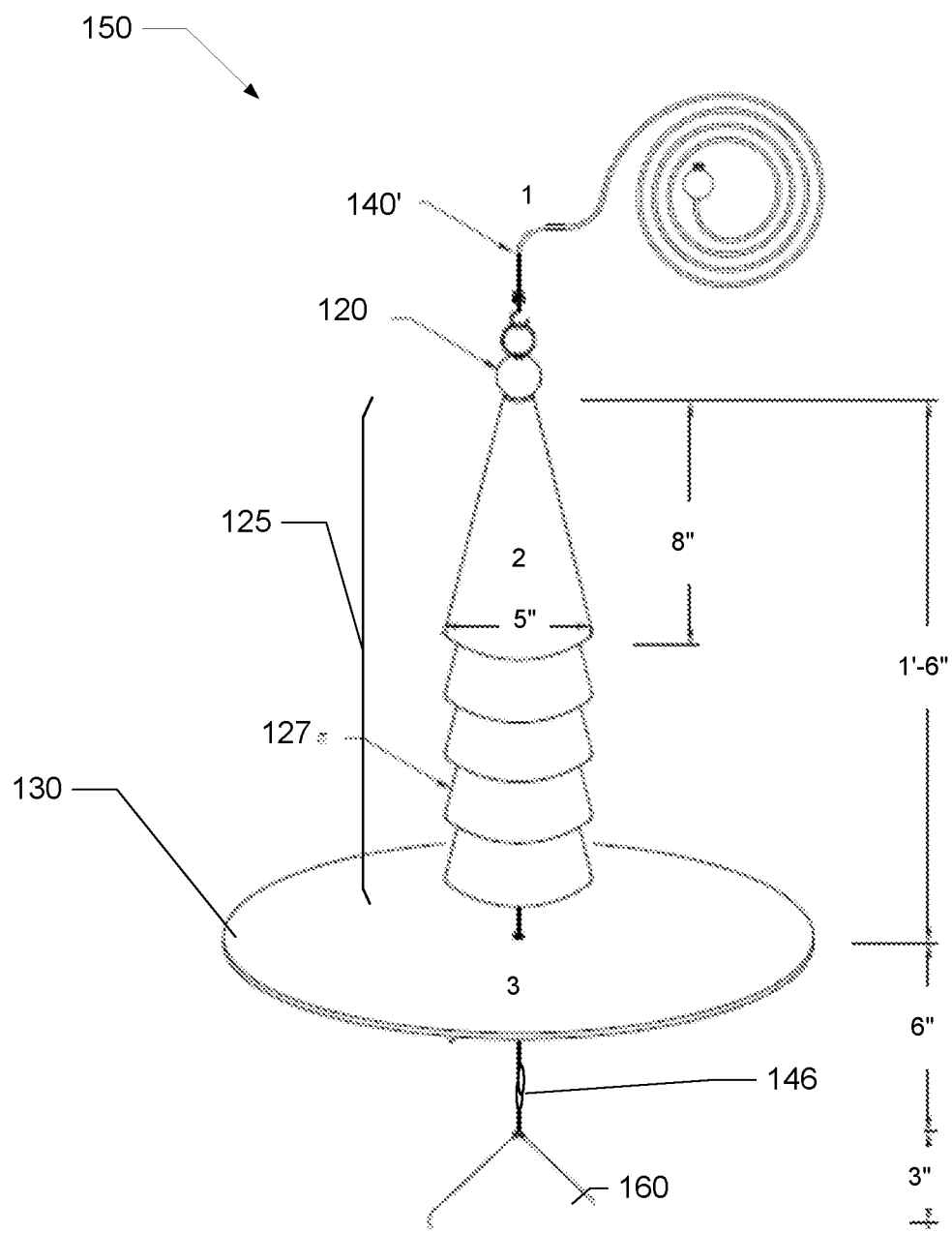
FIG. 1B illustrates another example critter deterrent barrier/deflector assembly, with vertical dimensions indicated, in accordance with one or more embodiments.

With specific reference now to FIGS. 1A and 1B, there are illustrated two embodiments of a critter deterrent barrier/deflector assembly, according to two different embodiments. Within the description of FIG. 1A, reference is further made to FIG. 2, as components of that figure are presented within the description of FIG. 1A. The description of FIG. 1A should therefore be read with reference to both FIG. 1A and FIG. 2, where indicated. In the embodiment presented by FIG. 1A, critter deterrent barrier/deflector assembly 100 includes a connecting cable 105. In order to illustrate the features and connectivity aspects of the figure, the figure is presented as if the cones 125 are transparent, enabling a view of the connecting cable 105 and connecting components (112 and 107) that are connected thereon or extended thereon.

Connecting cable 105 has a first (lower) end, located proximate to a top of a bird feeder (as presented in FIG. 2), the lower end including an attachment mechanism 145 or a knotted loop to connect to a connection mechanism (see FIG. 2) of the attached bird feeder. A second end of the connecting cable 105, opposed to the first end, is designed to be extended upwards for attaching to a pole, bracket, or other support structure immediately above the critter deterrent barrier/deflector assembly 100.

In at least one embodiment, the connecting cable 105 can be a strand wire, and the wire can be coated with plastic. Loops 115 and 145 are provided at each of the two ends of the wire to support attachment to a top of the bird feeder 205 and the supporting structure. In one embodiment, the loop 145 at the bird feeder end attaches to the loop or ring 220 at the top of the birdfeeder 205 by using an attachment structure, such as a carabiner or D-ring 144.

In one embodiment, as presented by FIG. 1B, the connecting cable is a continuous wire extending from the birdfeeder to the opposed (top) end that attaches or ties to the vertical supporting structure. In another embodiment, as shown in FIG. 1B, the connecting cable 105 of the critter barrier assembly 120 is segmented and includes one or more clip pairs 146 that can be disengaged to enable removal and/or engaged to enable attachment of different portions of the critter barrier assembly 120 and/or the deflector plate 130 along the length of the connecting cable. A bottom clip pair 146 enables connection of a bottom section of the wire to the top of the bird feeder. In one or more alternate embodiments, loops and/or knots can also be presented along other sections of the connecting cable 105 to support the cones, balls, or other component parts of the critter deterrent barrier/deflector assembly 100 through which the connecting cable is passed/extended.

Critter deterrent barrier/deflector assembly 100 also includes a deflector plate 130 that extends perpendicular relative to the top vertical surface (or roof) of the bird feeder. According to one aspect of the disclosure, the deflector plate 130 has a larger circumference/width than the width of the bird feeder and extends laterally (i.e., in an elevated horizontal direction) past the outer/exterior structure/edges of the bird feeder in each lateral direction. The deflector plate 130 blocks a view of the bird feeder from above the deflector plate 130 (i.e., a squirrel or other critter that makes it onto the deflector plate is unable to peek over and see or physically access the bird feeder below. In one embodiment, deflector plate 130 is an aluminum pan; However, it is appreciated that deflector plate 130 can be constructed of different material, so long as sufficiently rigid to hold the weight of one or two critters landing thereon, as the critters attempt to climb downwards to the bird feeder.

The critter deterrent barrier/deflector assembly 130 also includes a cone assembly 125 that include one or more open cones 125 extending vertically in a partially-overlapping manner above the deflector plate 130. Four overlapping cones 127 are shown in the illustrative embodiment; However it is appreciated that a different number of cones 127 can be provided, in alternate embodiments. In one or more embodiments, cones 127 are "no-grip" cones, whereby an exterior surface of the cones 127 is made of a slick material or otherwise treated such that a critter is unable to grip onto the surface of cones 127.

The one or more cones 127 are arranged vertically relative to the connecting cable 105, which extend centrally though a hole in the top/apex of each cone. Each cone within the cone assembly 125 has a narrow end (apex) that is physically connected to the connecting cable 105 or abutting a supporting structure (e.g., interior support balls 107) that is attached to the connecting cable 105. Each cone 127 also has a larger end that flanges out from the narrow end (apex) to provide the conical structure. According to one aspect, in part illustrated by FIG. 1B, the assembly 125 of the one or more cones 127 have a length/height dimension that is greater than that of an adult squirrel (e.g., 18"+/−), which forces a squirrel attempting to access the bird feeder to have to extend at full length from a top of the cone assembly 125 with its hind legs to the edge of the deflector plate 130 with its front paws. Additionally, the one or more cones 127 are made of relatively smooth material to prevent gripping of the middle portion of the cone assembly 125 by the squirrel with its back legs. This combination of the extension distance and smooth texture of the cone's exterior surface prevents the critter from being able to grip onto the top of the cone assembly and extend itself past the cone assembly 125.

FIG. 1B illustrates some of the dimensions of the cone assembly portion of the critter deterrent barrier/deflector assembly 130. According to one embodiment, the total length of the cone assembly is determined based on the average length of a critter, such as a squirrel, that will likely attempt to traverse the deflector assembly. Empirical testing of the different sizes of cones and total length yield some specific dimensions that are indicated within FIG. 1B, as possible dimensions for general implementation. As provided within FIG. 1B, each cone can be approximately 8 inches and the combined height of the stacked assembly of cones can be approximately 18 inches. Deflector plate 130 can then be approximately 6 inches above the feeder below (generally 160). FIG. 1B also presents an alternate embodiment in which the bottom cone 127D is not abutting deflector plate 130. Additionally, only one ball 120 is provided above the cones with a ring directly attached to a top of connecting cable 105 (shown between deflector plate 130 and last cone 127D). A wrapped wire extension 140' represents the wire extension (140) of FIG. 1A. At the other end of the connecting cable 105 or cable extension 140' is a large wooden ball with a hole through the center. In one embodiment, the wire loops through the ball and is connected to itself using standard aluminum ferrule.

Refocusing now on FIG. 1A, each adjacent pair of cones 125 has a lower, open portion of an upper cone overlapping a top portion of a body of a lower cone. The apex of each cone 125 is open, providing a hole through which the connecting cable 105 passes. A plurality of small balls (107) and ferrules (112) are utilized to secure each cone in a specific vertical position along the connecting cable 105 relative to the cone above or below. Each of the balls has a through hole through which the connecting cable 105 passes. In one embodiment, the ferrules are made from aluminum and can be single ferrules or double ferrules, based on the specific use of the ferrule.

Referring now specifically to the focused, exploded view of the lower section of critter deterrent barrier/deflector assembly 110. In exploded view, the connectivity of deflector plate 130 and bottom cone 125D is shown in greater detail. As shown, the bottom cone 125D is secured to the top of the deflector plate 130 using one of the small balls 107 placed at the top of the cone, with the base of the cone abutting and/or in physical contact with the top surface of the deflector plate 130. The bottom cone 125 and small ball 107 are then held in place relative to the connecting cable 105 and deflector plate 130 by applying a single ferrule or other holding method or mechanism that would provide a similar resulting function as the ferrule 112. Deflector plate 130 is then securely held in pace from the bottom side using a washer 132 and a double ferrule 112$b$. In one embodiment, washer is a plastic washer. Connecting cable 105 extends below double ferrule 112$b$ before terminating in a lower loop 145, which is created using double ferrule 112$z$ or other methodology or mechanism for creating an end-of-wire loop.

Thus, viewed from the bottom up, connecting cable 105 begins with a bottom loop 145 that is created by bending the end of connecting cable 145 and connecting the end to a next lower segment of connecting cable by an aluminum ferrule 112$z$. In an alternate embodiment, a separate ring is provided and attached to connecting cable 105 using the aluminum ferrule to create a small loop around the separate ring. Above the bottom loop is a second ferrule attached below a plastic washer 132 and which holds metal deflector plate 130 in place. As one benefit in addition to its structural function of helping to retain deflector plate 130 at its vertical position along connecting cable 105, plastic washer 132 prevents second ferrule 112 from scratching the paint on the bottom of the metal pan used to provide deflector plate 130 to prevent rust. The connecting cable 105 goes up through the deflector plate 130 and bottom cone 127D. On top of the bottom cone 127D is a ball 107. In one embodiment, ball 107$z$ is made of plastic and is substantially spherical in shape. However, other types of balls are possible, and the introduction herein of a specific material and/or shape of ball is not intended to be limiting on the disclosure. A single ferrule 112$a$ is secured to connecting cable 105 above ball 107$z$ and the combination of ferrule 112$a$ and ball 107$z$ secures the bottom cone 127D snuggly in place against the top surface of deflector plate 130 so deflector plate 130 does not tilt.

In the described embodiments, the deflector plate 130 operates as both a physical and visual barrier plate 130. Deflector plate 130 is of an empirically-determined horizontal dimension (e.g., width or circumference) to prevent a critter hanging down from the top of the supporting structure from being able to see or access the bird feeder 150 from the vertical hanging position. The deflector plate 130 can be shaped as a dish and can be made of a translucent material, including a metal pan or molded plastic. The deflector plate 130 has a centrally located hole through which the wire extends and is supported vertically by a knot or other stopping affordance place below on the wire beneath the hole. The deflector plate 130 is held in a substantially horizontal alignment, with the base of the lower cone 127D pressed against the top surface of the deflector plate 130 and the ferrule 112b operating as a stopping affordance when the assembly is extended vertically. The deflector plate 130 thus blocks a vertical line of sight to the bird feeder from the top surface of the deflector plate 130.

During empirical testing, it was discovered that if deflector plate was allowed to tilt in some configurations, squirrels would time their jumps from the trees for when the deflector plate 130 rotated such that the squirrel would see the tilted up side instead of the tilted down side, allowing the squirrel to make the jump directly to the feeder. However, by making the deflector plate 130 stationary, the squirrels would refrain from jumping towards the bird feeder, perhaps due to an understanding that they would hit the deflector plate 130 on the way in.

Figure 4A:
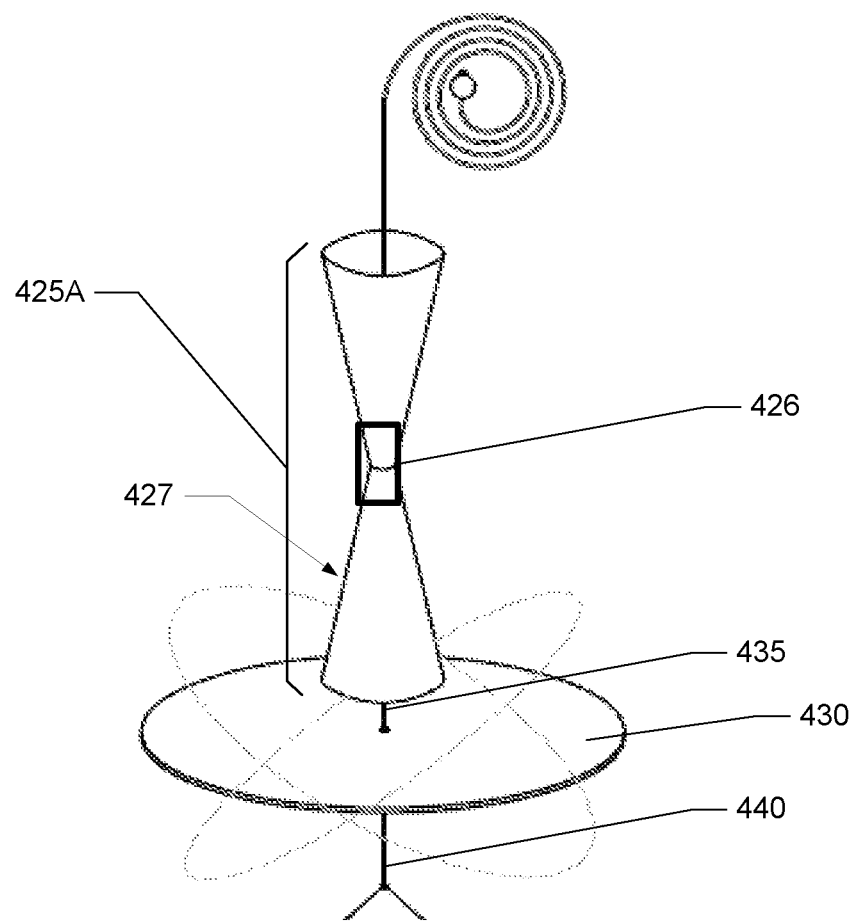

According to one alternate embodiment, and as illustrated by FIGS. 1B and 4A, the dimension and placement of the deflector plate 130 is such that the distance from the middle of the deflector plate 130 to any exterior edge of the deflector plate 130 is greater than the vertical distance between the stopping affordance (i.e., the ball at the bottom of the deflector plate) and the top of the bird feeder 205. Also, according to one more embodiments, the deflector plate 130 has a top surface that is relatively slippery or slick to prevent gripping by a critter's paws. In this embodiment, the deflector plate 130 balances horizontally on a lower ball, with the ferrule 112b operating as a stopping affordance for the lower ball when the assembly is extended vertically. Further, an additional upper component (such as, but not limited to an upper ball and ferrule) is provided above the deflector plate 130 that prevents the deflector plate from tilting away from the horizontal position until a weigh of a critter jumping onto or attempting to climb down unto the top surface is received. By placing the deflector plate 130 on a centrally located ball or other stopping affordance, and extended a determinable number of inches below the lower cone 127D, the deflector plate 130 automatically cantilevers from a horizontal position downwards at an angle, in any direction in which a force (such as a weight of a critter) is applied to the top surface of the visual barrier. Because of the lack of grip and downward angle of the deflection, a critter which places its weight on the deflector plate 130 is propelled downwards past the bird feeder 150 and consequently is unable to access the food in the bird feeder 205.

Referring again to FIG. 1, according to the illustrated embodiments, the critter deterrent barrier/deflector assembly 100 further includes a plurality of balls 120 that extend along the connecting cable 105 from a topmost cone upwards to the upper loop of the connecting cable 105. The plurality of balls 120 are spherical is shape and each ball is configured with a through hole, with the connecting cable 105 extended there-through. In one or more embodiments, the balls 120 are glass beads.

In one embodiment, the connecting cable 105 is passed/extended upward through the cones, the three balls, and then extends a number of feet for hanging at the vertical support structure. According to one aspect, the connecting cable 105 used for critter deterrent barrier/deflector assembly 100 has sufficient tensile strength to hold, while the critter-proof bird feed apparatus is extended from above via the connecting cable 105 attached to an upper support, a weight of the critter deterrent barrier/deflector assembly 100 concurrently with a combined weight of the bird feeder (FIG. 2), a number of birds perched on the bird feeder, and one or more critters impinging on the assembly from time to time as the critter attempts to access the feeder. The critter deterrent barrier/deflector assembly 100 effectively prevents critters from being able to gain access to the bird feeder when the critter-proof bird feed apparatus is hung up at a height above ground that is higher than a jumping height of the critter.

In one embodiment, the connecting cable 105 is made up of multiple interconnected segments, ending with a wire segment 110 extending from the topmost cone 127A. Wire segment 110 is made of a wire having sufficient hardness to withstand chewing thereon by one or more critters. According to one embodiment, the wire utilized for wire segment 110 is plastic coated, frayed wire. Further, in at least one embodiment, as with the illustrated embodiment, an end of the wire is configured as a loop 115 for short-hanging (i.e., without an additional length of wire) the bird feed apparatus. In at least one embodiment, configuring the wire as a loop 115 involves looping the end of the wire 110 and using a double ferrule 112 to secure the end to another portion of the wire 110.

As further illustrated by FIG. 1A, in one or more embodiments, connecting cable 105 can include or be extended by a second wire, wire extension 140, coupled to the loop 115 via an end loop of second wire (secured with a ferrule) or D-ring connector 114. The wire extension 140 may also be configured with loops 141, 143 at both ends for this purpose, similar to loop 115 of wire 110. In one embodiment, second loop 143 (i.e., the loop positioned away from critter deterrent barrier/deflector assembly 100) has a ball 144 presented therein. The inclusion of the ball 144 enables a user to differentiate which loop is to be used for connecting with the loop 115 or wire 110, as one practical application. In one or more embodiments, the wire extension 140 can be extended upwards away from the assembled bird feeder apparatus and used for attaching the bird feeder apparatus to a higher supporting structure, such as a tree limb. The higher supporting structure can be located vertically above the bird feeder apparatus. In one alternate implementation, the wire extension 140 can be used for extending around a tree limb or other upper support and then extending downwards to attach or connect to another structure to which the wire extension 140 can be tied/attached. The length of the wire extension 140 is variable and can be as long as 12 feet or longer.

Figure 2:
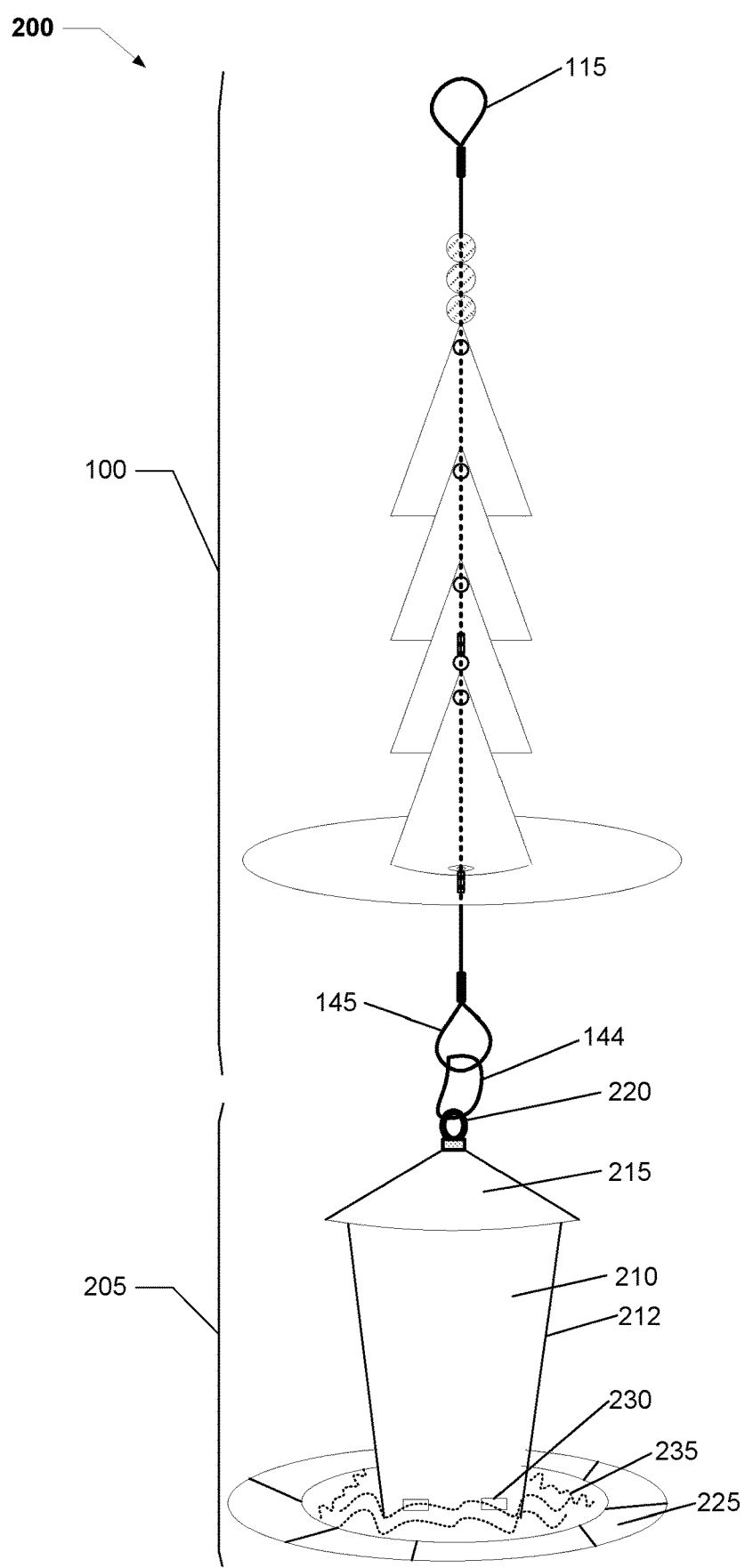
FIG. 2 depicts illustrates a fully assembled critter-proof bird feed apparatus complete with components of the critter barrier/deflector assembly of FIG. 1A coupled to a bird feeder configured with an inverted conical shaped side walls, according to one or more embodiments.
Figure 3:
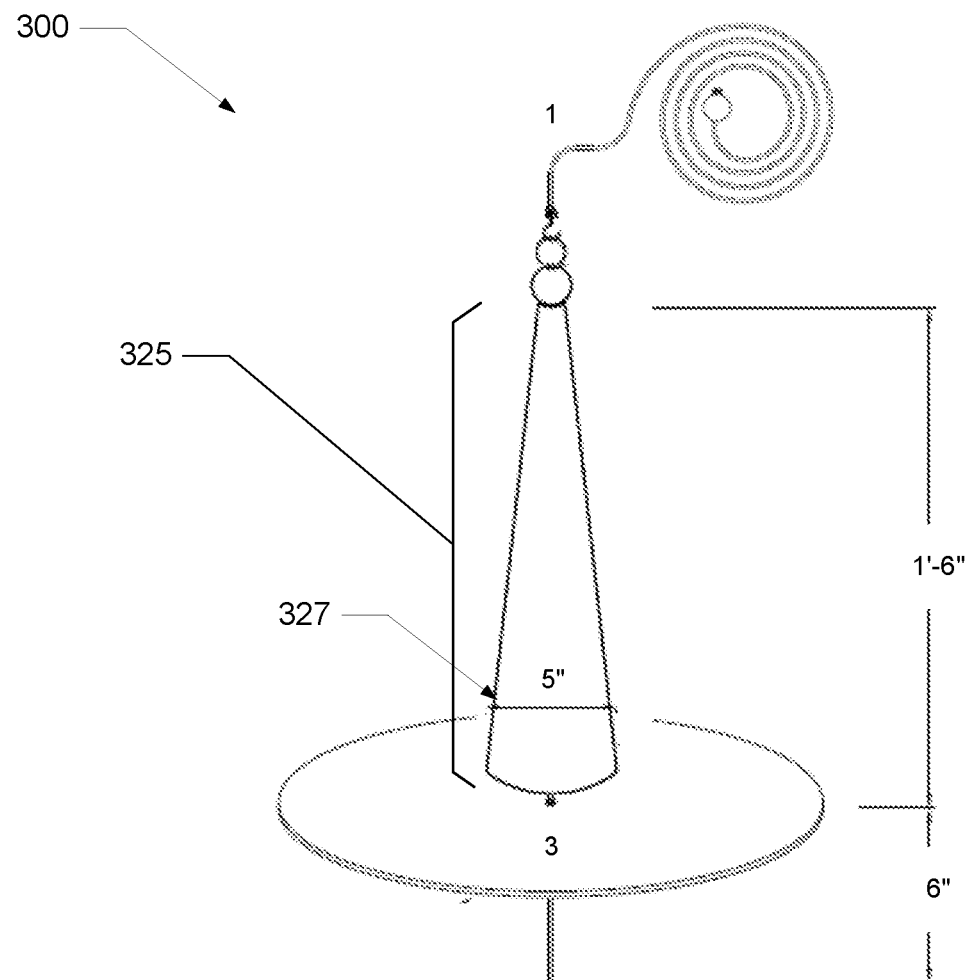
FIGS. 3, 4A, 4B, and 5 illustrates several different embodiments of critter deterrent barrier/deflector assemblies, each having a different number and/or configuration of cones and a cylinder, according to multiple embodiments.

FIG. 2 illustrates a completely-assembled critter-proof bird feeder apparatus 200, which includes critter deterrent barrier/deflector assembly 100 of FIG. 1A. Critter-proof bird feeder apparatus 200 further includes bird feeder 205, which is attached below the deflector plate 130 of the critter deterrent barrier/deflector assembly 100 via a connecting mechanism. In the provided embodiment, connection mechanism includes a D-ring 144 and a top-ring 220 of bird feeder 200 for hanging the bird feeder 205 to a pole or for connecting an extension cable thereto. The bird feeder 205 includes a hollow housing unit, volumetric enclosure 210, for holding and protecting a supply of feed. The enclosure has exterior walls 212 and one or more apertures 230 at a bottom section of the walls 212 through which a portion of the feed 235 exits the enclosure 210. The bird feeder 205 also includes feed dispensing tray 225 attached to a bottom of the volumetric enclosure 210 as a base plate. Feed dispensing tray 225 presents a surface to the outside of the bird feeder 205 on which the portion of the feed 235 exiting the enclosure 210 through the apertures 230 is exposed for consumption.

According to one embodiment, feed dispensing tray 225 of the bird feeder 205 is made of a flexible material that easily collapses or bends/folds downwards whenever a sufficiently large force, such as the weight of a critter, is applied to the top surface of the plate. Additionally, the material utilized to make feed dispensing tray 225 has sufficient tensile strength to withstand a smaller force/weight, such as that of a small number of birds perched thereon. In one embodiment, feed dispensing tray 225 is a rubberized plastic in the shape of a pie pan, and the rim flexes downward when a squirrel or other larger critter (heavier in weight than a couple of birds) attempts to sit or jump on the base plate. The feed dispensing tray 225 then flexes back up to a horizontal position when the weight of the critter is gone.

Because of the relative lighter weight (e.g., 1 to 2 ounces) of the birds, the perching by the birds on the feed dispensing tray 225 do not cause the base plate to collapse, and, as such, the birds can perch on the feed dispensing tray 225 and consume the dispensed feed. In one alternate embodiment, the feed dispensing tray 225 actually falls away from the feeder when sufficient force is applied from a critter attempting to jump or hang onto the base plate. In one embodiment, feed dispensing tray 225 can be an off-the shelf component that is purchased separately from the bird feeder and retrofitted as the feeding tray of the bird feeder (in place of the original feeding tray).

The bird feeder 205 also includes a cover component 215 fixably attached to a top of the volumetric enclosure 210 and having a connection mechanism (top-ring 220) attached to a top surface for receiving a connecting cable (e.g., D-ring 144 and/or loop 145). Cover 215 is a removable cover. When cover 215 is removed, a hollow interior of the bird feeder is exposed to enable insertion of the feed inside the volumetric container 210 or other interior component for storing the feed. Cover 215 is then securely attach to a top of side walls 212 of volumetric container 210 to protect the feed from exposure to rain and other environmental elements, and from top access by critters or birds into the volumetric container 210.

According to the illustrated embodiment, the side walls 215 of the bird feeder 205 is designed as an inverted, open conical-shaped cylinder having gradually decreasing circumference from top (i.e., below cover 215) to bottom (i.e., at feed dispensing tray 225), with a top of the volumetric enclosure 210 having a larger circumference than the bottom of the volumetric enclosure 210 closest to the feed dispensing tray. The inverted, open conical-shaped housing prevents critters from being able to grab onto an exterior surface of side walls 215 of the bird feeder 205 when the critters attempt to jump onto and grab on to the bird feeder walls 215.

According to one alternate description of the aforementioned completely-assembled critter-proof bird feeder apparatus presented by FIGS. 1A-1B and 2, includes bird feeder 205 and a connecting cable 105 (or wire) extending vertically above the bird feeder 150, with a first end, proximate to (and, in some embodiments, attached to) a top of the bird feeder and a second end, extending away from the bird feeder for coupling or attaching to a supporting structure (not shown), such as a tree limb, located vertically above the bird feeder. Critter barrier/deflector assembly 120 then extends along a portion of the connecting cable 105 between the top of the bird feeder and the second end of the wire 110.

Figure 4B:
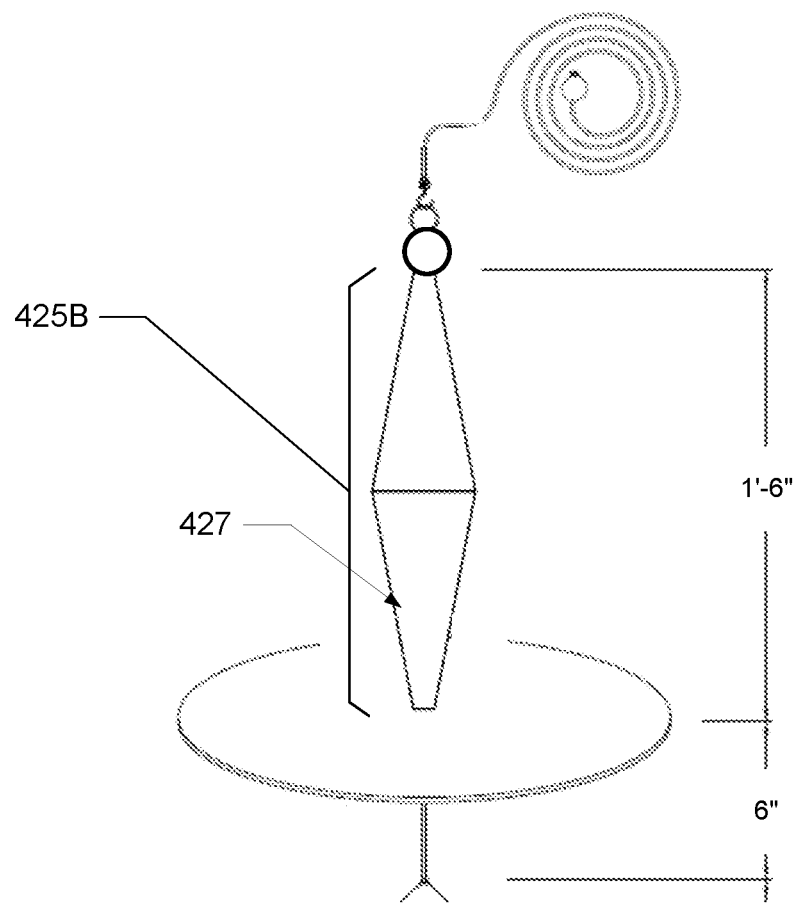

In the embodiments illustrated by FIGS. 1A-1B and 2, cone assembly 125 consists of a plurality of vertically-spaced, partially-overlapping cones 127. FIGS. 3, 4A-4B, and 5 illustrates several different, alternate embodiments of critter-proof bird feed apparatuses, each deploying a different configuration of the critter deterrent barrier/deflector assembly, according to multiple embodiments. According to one embodiment and as illustrate by FIG. 3, critter deterrent barrier/deflector assembly 300 provides cone assembly 325 that includes a single elongated cone 327. According to one aspect of this embodiment, the length/height of the single cone 327 is substantially equal to that of the combined set of cones 127 within cone assembly 125 (FIGS. 1A-1B, 2). In yet another embodiment, as illustrated by FIGS. 4A-4B, cone assembly 425A, 425B includes a pair of cones 325, arrange with adjoining apexes (FIG. 4A) and adjoining bases (FIG. 4B). Notably, the resulting structures of cone assembly 425A, 425B also provide a collective length/height that is similar to the length of cone assembly 125 (FIG. 1) (i.e., the average length of the outstretched squirrel). Thus, in FIG. 4A, a top cone of the pair of vertically aligned cones is inverted with its smaller top end (apex) placed adjacent to and abutting the top (apex) of the second, lower cone. Further, the apexes of the two cones are connected using an annulus 426 or other connector made of rubber or other material. This embodiment also illustrates the aforementioned embodiment in which the deflector plate 430 is not abutting the lower cone 427 and is allowed to cantilever based on the extended cables 435 and 440 above and below deflector plate 430 and the ball placed below the deflector plate operating as a rotating point or fulcrum. In FIG. 4B, the pair of cones are vertically aligned with the bottom flanged ends of the two cones abutting each other in a middle section of the cone assembly 425B.

Figure 5:
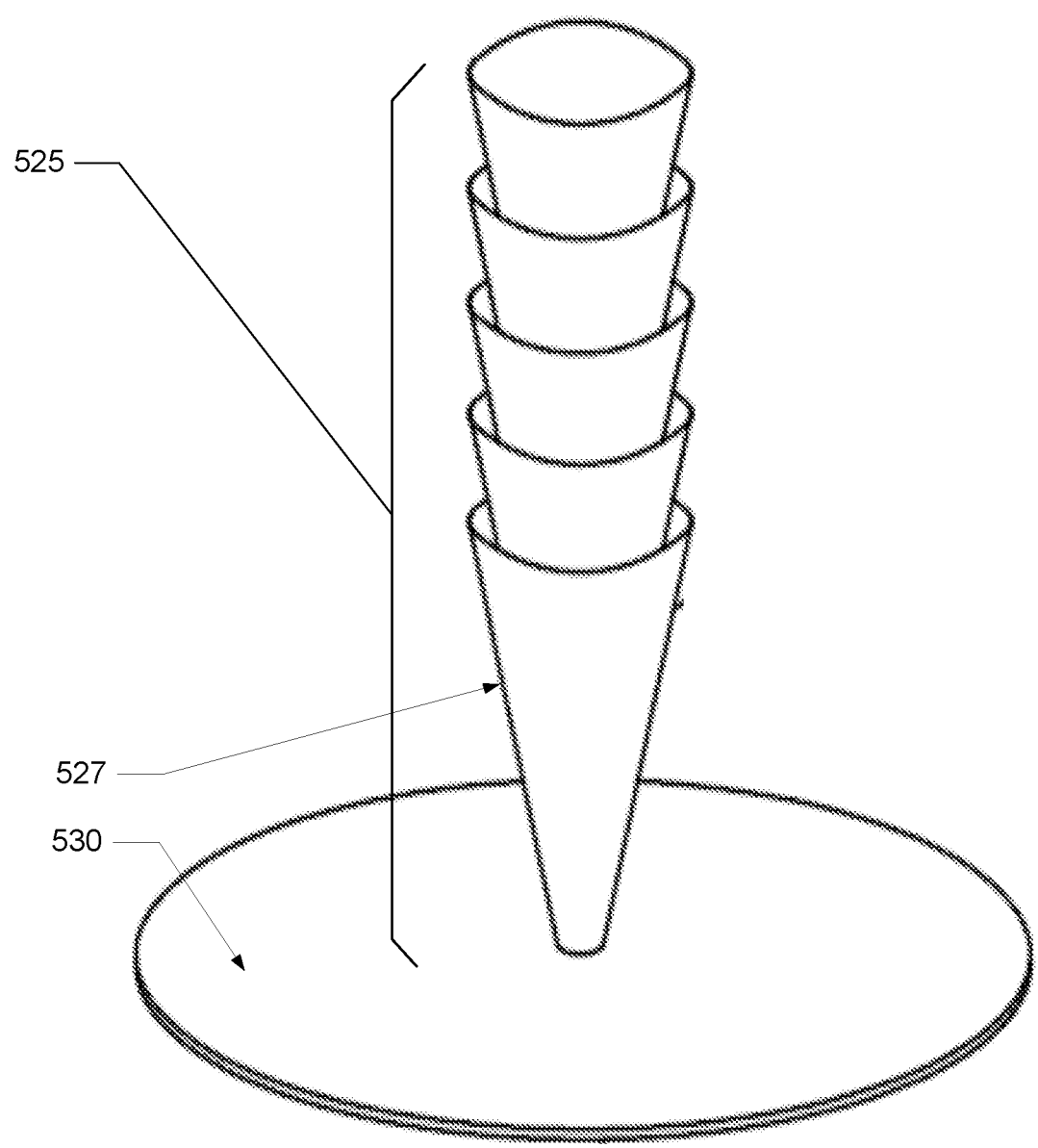

FIG. 5 illustrates a different configuration of cone assembly 525 made up of vertically-spaced, inverted overlapping cones 527, according to one or more embodiments. In FIG. 5, the apex of the lower cone abuts the deflector plate 530. Balls, secured in place by ferrules are placed at the proper vertical spacing along the connecting cable below the point at which the apex of each other cone is expected to sit.

Figure 6:
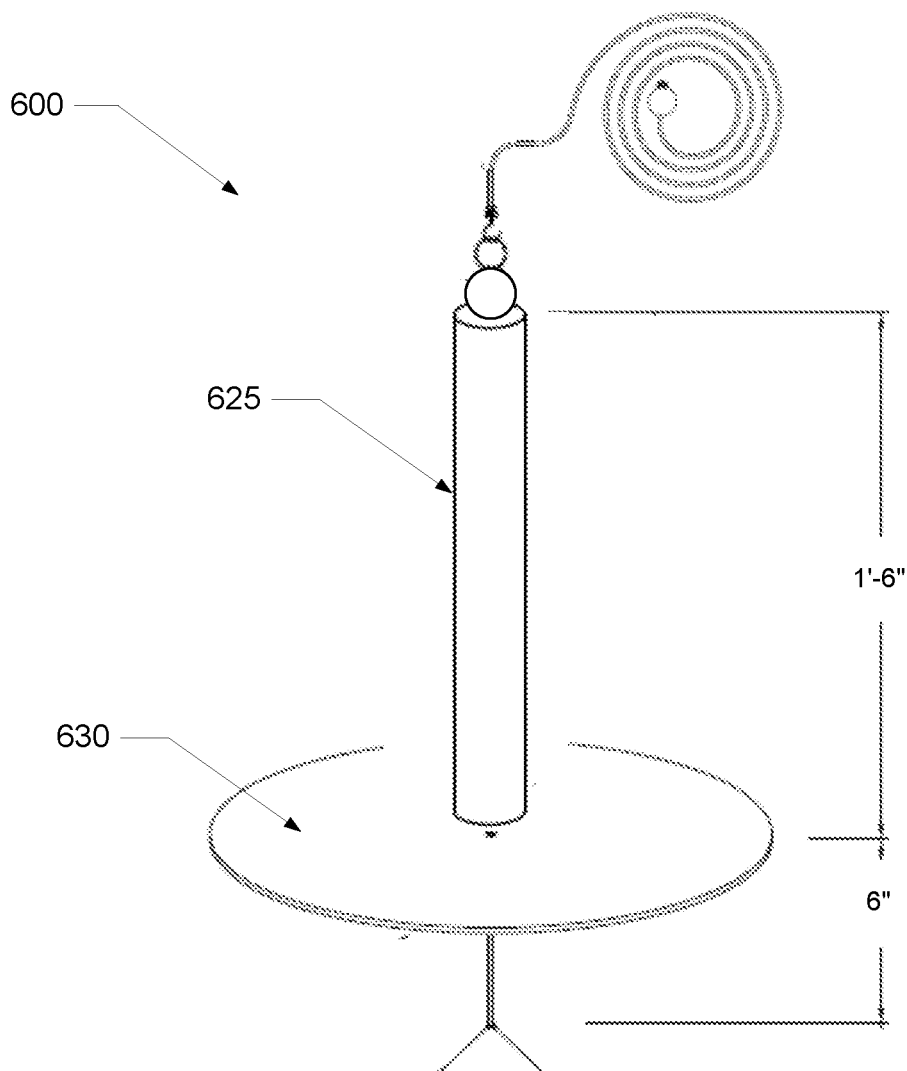
FIG. 6 illustrates a critter deterrent barrier/deflector assembly with the cones replaced by a cylinder, according to one embodiment.

In an alternate embodiment, as illustrated by FIG. 6, critter deterrent barrier/deflector assembly 300 is designed with a large diameter, hollow cylindrical pipe 625 that extends vertically down the cord, at least as long as the length of an adult squirrel. The hollow cylindrical pipe 625 thus replaces the cone assembly. The hollow cylindrical pipe 625 is also provided with a smooth/slick exterior surface to prevent gripping of the pipe by the critter attempting to climb down to the deflector plate 630 and/or the bird feeder.

Figure 7:
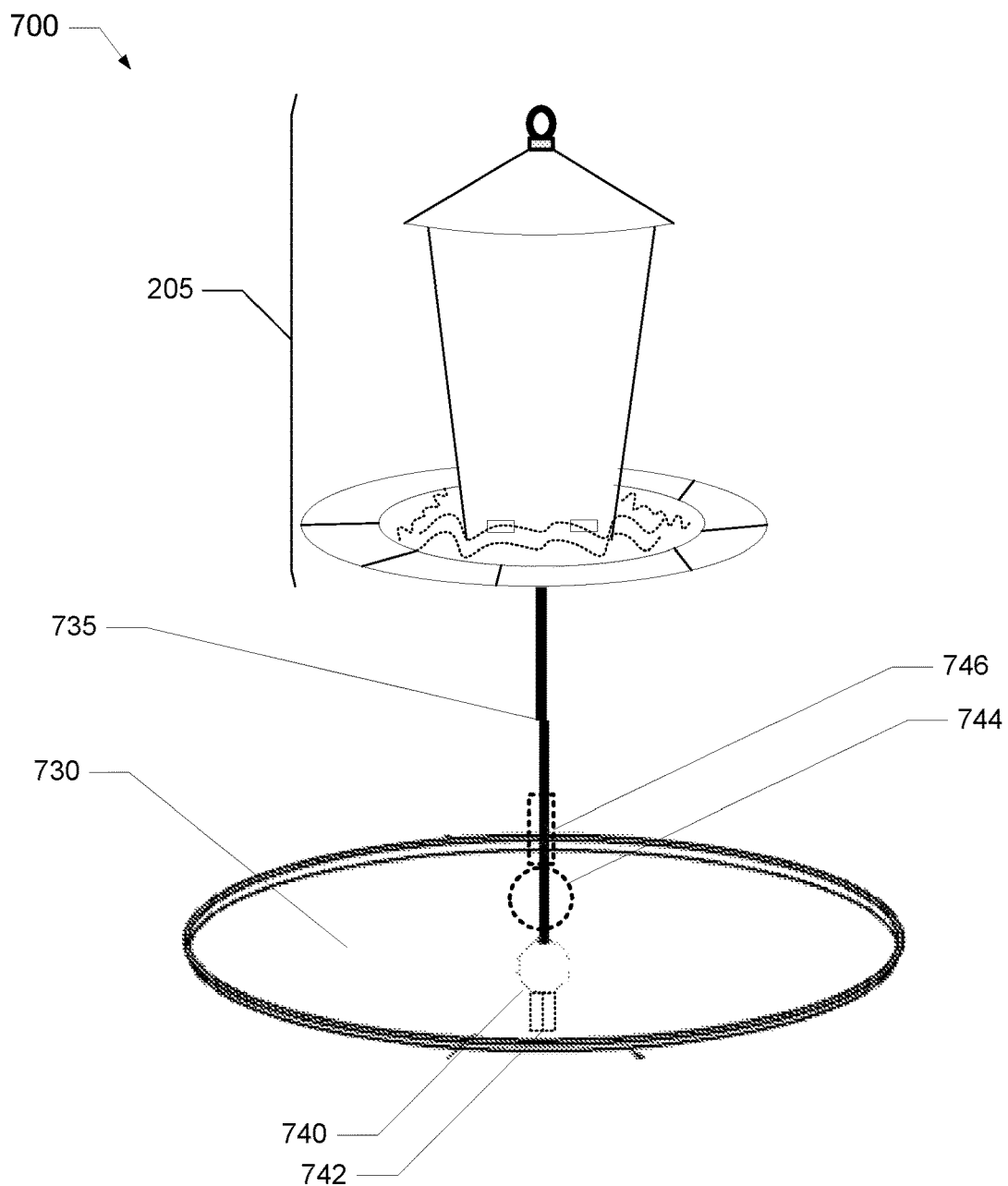
FIG. 7 provides an illustration of a bottom-plate based, critter-proof bird feed apparatus with a flexible base that prevents bottom access by critters to an elevated bird feeder, according to one or more embodiments.

FIG. 7 provides an illustration of a bottom-plate based, critter-proof bird feed apparatus with a flexible base that prevents bottom access by critters to an elevated bird feeder, according to one or more embodiments. As illustrated by FIG. 7, a bottom critter barrier assembly 700 includes a bottom deflector plate 730 that is designed to be attached to a bottom surface 725 of the bird feeder 205 via a second cable 735 to serve as a physical and visual barrier. The configuration, dimension, and use of the bottom deflector plate 730 can be similar to that of the aforementioned upper deflector plate 430/530/630. However, the bottom deflector plate 730 is provided to prevent the critter from having a visual line of sight when attacking the bird feeder from the bottom or ground surface, and also to prevent the critter from being able to reach the bird feeder 205 from the ground or lower surface. The top surface of the bottom deflector plate 730 is made slick/smooth to prevent the critter being able to grip onto the top surface of the bottom deflector plate 730. Additionally, in one embodiment, the bottom deflector plate 730 is designed to cantilever around a bead 740 placed immediately below the bottom deflector plate 730 to operate as a pivot around which the bottom deflector plate 730 cantilevers in response to a force or weight being applied to the top surface or sides of the bottom deflector plate 730. In one embodiment, bead 740 is held in place by ferrule 742 and washer (not shown). In one embodiment, a second bead 744 or other upper support component is placed on top of the bottom deflector plate 730 and held in place by a top ferrule 744 to prevent the bottom deflector plate 730 from cantilevering on its own without the weight of the critter hitting the top surface of the bottom deflector plate 730.

In one or more embodiments, the bottom deflector plate 730 is made from a flexible material such that the material bends/collapses with the weight of the critter and prevents the critter from having a secure footing to reach up to the base plate of the bird feeder 205. In one embodiment, the bottom deflector plate 730 is a rubberized plastic in the shape of a pie pan, and the rim flexes downward when a squirrel or other larger critter (heavier in weight than a couple of birds) attempts to sit or jump onto the bottom deflector plate 730. The bottom deflector plate 730 then flexes back up to a horizontal position when the critter falls off and the weight of the critter is removed.

Figure 9:
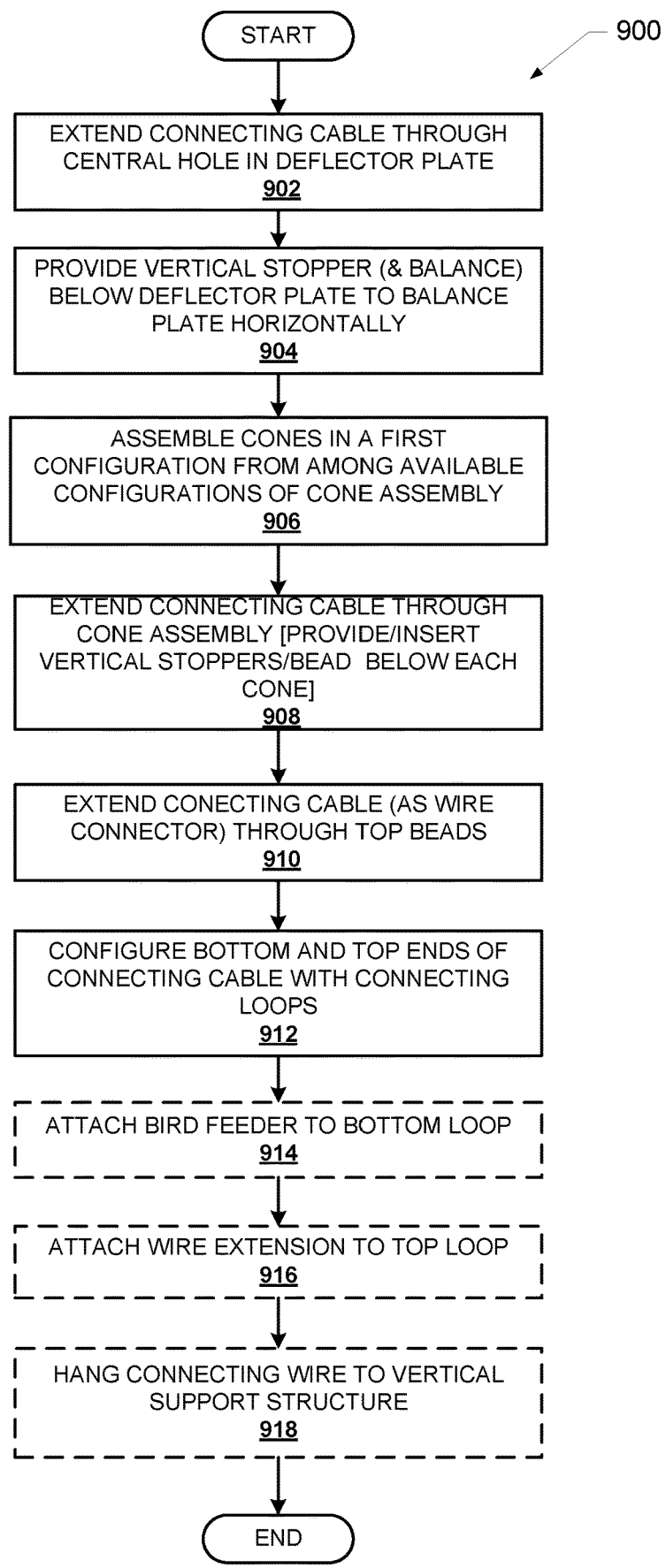
FIG. 9 is a flow chart illustrating a method for assembling a critter deterrent barrier/deflector assembly of a critter-proof bird feeder apparatus, according to one or more embodiments.

FIGS. 8 and 9 generally provides method 800 of manufacturing and method 900 of assembling a critter-proof bird feeder apparatus that attaches to a bird feeder and prevents critters from accessing the bird feeder. The method 800 of manufacturing the above bird feed apparatus involves assembling each of the components parts and providing a central hole through each component to enable insertion of the connecting cable through the central hole. Wire extension 140 is also provided along with clips and additional ferrules to allow a user of the assembly to attach the bird feeder to a higher limb of a tree, if desired. The user can thus hang the assembly from the loop 115 directly from a pole or a bracket, etc. Alternatively, the user can utilize the extra wire provided by wire extension 140 and clips to hang the assembly from a much higher structure or to strap over a limb enabling the second end 144 to be tied or attached to a lower structure, reachable from the ground. The method 800 can include packaging the components into a single package, with an installation guide included therein. In one embodiment, the critter barrier assembly 120 is manufactured and packaged separately from the bird feeder 150 and the wire 105 is designed to be attachable to any commercially available or home-made hanging bird feeder. According to one aspect, the critter barrier assembly can be sold as a part of a bird feed system. The overall assembly of the bird feeder with critter barrier assembly, including one or more visual barrier plates, effectively prevent squirrels and raccoons from feeding from the feeder, despite the extremely agility of these critters.

Referring now to FIG. 8, there is provided the method 800 for manufacturing a critter-proof bird feeder apparatus. Method 800 begins at start block and proceeds to block 802. At block 802, method 800 includes providing a connecting cable capable of extending vertically above a bird feeder, with a first end proximate to and attached to a top of the bird feeder and a second end configured as a loop for attaching to a pole, bracket, or other support structure immediately above the bird feeder. At block 804, method 800 includes providing a critter barrier/deflector assembly that extends along a portion of the connecting cable between the top of the bird feeder and the second end of the connecting cable, the critter barrier/deflector preventing critters from being able to gain access to the base plate and the feed within the bird feeder.

As shown, providing the critter barrier/deflector assembly (804) includes providing a deflector plate and attaching the deflector plate to the connecting cable such that the deflector plate extends perpendicular to the top surface of the bird feeder (block 806). The deflector plate has a larger circumference/width than and extends laterally past the exterior walls of the bird feeder in each lateral direction. The deflector plate blocks a view of the bird feeder from above the deflector plate. Providing the critter barrier/deflector assembly (block 804) also includes providing a plurality of cones and attaching the plurality of cones to the connecting cable such that the cones extend above the deflector plate (block 808). Each adjacent pair of cones have a lower, open portion of an upper cone overlapping a top portion of a body of a lower cone.

In one embodiment, providing the critter barrier/deflector assembly further includes providing a plurality of balls and attaching the plurality of balls to the connecting cable such that the plurality of balls extends from a topmost cone upwards to the loop of the connecting cable (block 810). In one embodiment, the plurality of balls can be spherical-shaped. Each ball of the plurality of balls has through holes, with a segment of the connecting cable extended therethrough.

In one embodiment, in providing the connecting cable (block 802), the method 800 includes incorporating a frayed wired to at least an exposed top portion of the connecting cable (block 812). The frayed wire is of sufficient tensile strength to hold the bird feeder and attached critter barrier/deflector assembly while extended from above by the connecting cable, and the frayed wire is also sufficiently hard to prevent the wire from being chewed through by the critters. In one embodiment, the frayed wire is a plastic-coated wire rope.

According to one embodiment, the method 800 further includes providing a bird feeder having a hollow volumetric container within which feed can be placed for dispensing. The volumetric container has an exterior wall with one or more dispensing apertures presented therein. It is appreciated that the bird feeder also includes: a base plate that extends to allow one or more birds to perch thereon, the base plate or tray providing a surface for dispersing the feed from the one or more apertures; and a removable cover for exposing a hollow interior of the bird feeder to enable insertion of the feed and to securely attach to a top of the volumetric container to protect the feed from exposure to rain and other environmental elements, and from access from the top of the volumetric container. According to one embodiment, providing the bird feeder (814) includes manufacturing the bird feeder with the volumetric container including an open inverted conical shaped cylinder of gradually decreasing circumference from top to bottom, with a top of the volumetric container having a larger circumference than the bottom of the volumetric container that is closest to the feed dispensing tray (block 816). The inverted conical shape prevents critters from being able to grab onto an exterior surface of the bird feeder housing when the critters attempt to jump onto and hold on to the bird feeder housing. Method 800 then ends.

Referring now to FIG. 9, which provides a method 900 for assembling critter barrier/deflector assembly 100. Method 900 begins at start block and proceeds to block 902. At block 902, method 900 includes extending the connecting cable through a central hole in the deflector plate 130. Method 900 also includes providing a vertical stopper (and balancing component) to balance deflector plate 130 horizontally (block 904) when connecting cable is pulled in a vertical direction. Method 900 includes assembling cones in a first configuration desired to be used from among the multiple possible configurations (block 906). Method then includes extending the connecting cable though the cone assembly while providing the vertical beads as stoppers below the apex of each cone (block 908). It is appreciated that, as shown in FIG. 1A, a different handling of the lower cone can be implemented in some embodiments.

At block 910, method 900 includes extending wire connector through top beads or balls. Method then includes configuring the bottom and top ends f connecting cable with connecting loops (block 912).

In the description of method 900, dashed lines indicate optional processes. At block 914, method 900 optionally includes attaching a bird feeder to the bottom loop. Further, at block 916, method 900 optionally includes attaching a wire extension to the top loop. Finally, method 900 optionally includes hanging the connecting wire (or the top loop) to a supporting structure (block 918). Then method ends.

Aspects of method 800 and 900 can be completed as a part of a manufacturing process on an assembly line that can include automated components thereto. These automated components are then controlled by a controller having program code the enables the controller to present the specific manufacturing sequence for which the controller is applied. For example, the creation of one or more loops within each connecting cable or wire extension can be automated. Similarly, the configuration and dimension and/or shape of deflector plate 130 can be pre-programmed in a metal stamping process that generates deflector plates.

While the invention has been particularly shown and described with reference to a specific illustrative embodiments, it will be understood by those skilled in the art that various changes in form and detail may be made therein without departing from the spirit and scope of the invention.

The block diagrams in the various figures presented and described herein illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It will also be noted that each block of the block diagrams, and combinations of blocks in the block diagrams, can be implemented by special purpose hardware-based systems that perform the specified functions or acts, or combinations of special purpose hardware and computer instructions.

While the above disclosure has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A critter-proof bird feed apparatus comprising:
    a critter deterrent barrier/deflector assembly designed for attaching to a top surface of a bird feeder and extend vertically upwards above the bird feeder, the critter deterrent barrier/deflector assembly comprising:
        a connecting cable having a first end, proximate to a top of the bird feeder housing assembly, attached via an attachment mechanism or knot to the connection mechanism and a second end for attaching to a pole, bracket, or other support structure immediately above the critter deterrent barrier/deflector assembly;
        a deflector plate that extends perpendicular to the top surface of the bird feeder housing assembly, the deflector plate having a larger circumference/width than and extending laterally past an exterior edge of the bird feeder in each lateral direction, the deflector plate blocking a view of the bird feeder from above the deflector plate; and
        a plurality of cones extending above the deflector plate, each adjacent pair of cones having a lower, open portion of an upper cone overlapping a top portion of a body of a lower cone.

2. The critter-proof bird feed apparatus of claim 1, wherein the critter deterrent barrier/deflector assembly further comprises:
    a plurality of spherical balls extending from a topmost cone upwards to the loop of the connecting cable, the plurality of spherical balls having through holes, with the connecting cable extended there-through.

3. The critter-proof bird feed apparatus of claim 1, wherein the connecting cable has sufficient tensile strength to hold a weight of the critter-proof bird feed apparatus concurrently with a combined weight of a number of birds perched on the bird feed housing assembly and one or more critters while the critter-proof bird feed apparatus is extended from above via the connecting cable attached to an upper support, and wherein the critter deterrent barrier/deflector assembly effectively prevents critters from being able to gain access to the bird feeder when the critter-proof bird feed apparatus is hung up at a height above ground that is higher than a jumping height of the critter.

4. The critter-proof bird feed apparatus of claim 1, wherein the connecting cable comprises multiple interconnected segments, with a segment extending from the topmost cone being made of a wire having sufficient hardness to withstand chewing thereon by one or more critters.

5. The critter-proof bird feed apparatus of claim 4, wherein an end of the wire is configured as a loop for short-hanging the bird feed apparatus and the connecting cable comprises a wire extension coupled to the loop and extending upwards away from the bird feeder apparatus for attaching to the higher supporting structure, located vertically above the bird feeder apparatus.

6. The critter-proof bird feed apparatus of claim 1, further comprising:
- the bird feeder comprising: a volumetric enclosure for holding a supply of feed, the enclosure have exterior walls and one or more apertures at a bottom section through which a portion of the feed exits the enclosure; a feed dispensing tray attached to a bottom of the volumetric enclosure as a base plate, the feed dispensing tray presenting a surface to the outside of the bird feeder assembly on which the portion of the feed exiting the enclosure through the apertures is exposed for consumption; and a cover component fixably attached to a top of the volumetric enclosure and having a connection mechanism attached to a top surface for receiving a connecting cable; and
- wherein the bird feeder housing container comprises an open conical shape cylinder of gradually decreasing circumference from top to bottom, with a top of the housing having a larger circumference than the bottom of the housing closest to the feed dispensing tray, wherein the conical shape prevents critters from being able to grab onto an exterior surface of the bird feeder housing when the critters attempt to jump onto and hold on to the bird feeder housing.

7. A critter-proof bird feed apparatus comprising:
- a bird feeder having: (i) a hollow volumetric container within which feed can be placed for dispensing, the volumetric container having an exterior wall with one or more dispensing apertures presented therein; (ii) a base plate that extends to allow one or more birds to perch thereon, the base plate or tray providing a surface for dispersing the feed from the one or more apertures; and (iii) a removable cover for exposing a hollow interior of the bird feeder to enable insertion of the feed and to securely attach to a top of the volumetric container to protect the feed from exposure to rain and other environmental elements, and from access from the top of the volumetric container; and
- a connecting cable extending vertically above the bird feeder, with a first end, proximate to and attached to a top of the bird feeder and a second end for attaching to a pole, bracket, or other support structure immediately above the bird feeder assembly; and
- a critter barrier/deflector assembly extending along a portion of the connecting cable between the top of the bird feeder and the second end of the connecting cable, the critter barrier/deflector comprising a deflector plate that extends perpendicular to the top surface of the bird feeder housing assembly, the deflector plate having a larger circumference/width than and extending laterally past an exterior edge of the bird feeder in each lateral direction, the deflector plate blocking a view of the bird feeder from a position above the deflector plate and preventing critters from being able to gain access to the base plate and the feed within the bird feeder.

8. The critter-proof bird feed apparatus of claim 7, wherein the critter barrier/deflector assembly comprises:
- a deflector plate that extends perpendicular to the top surface of the bird feeder, the deflector plate having a larger circumference/width than and extending laterally past an exterior edge of the bird feeder in each lateral direction, the deflector plate blocking a view of the bird feeder from above the deflector plate; and
- a plurality of cones extending above the deflector plate, each adjacent pair of cones having a lower, open portion of an upper cone overlapping a top portion of a body of a lower cone.

9. The critter-proof bird feed apparatus of claim 8, wherein the critter barrier/deflector assembly further comprises a plurality of spherical balls extending from a topmost cone upwards towards the second end of the connecting cable, the plurality of spherical balls having through holes, with an associated segment of the connecting cable extended there-through.

10. The critter-proof bird feed apparatus of claim 7, wherein an exposed top portion of the connecting cable comprises a frayed wire of sufficient tensile strength to hold the bird feeder extended from above, the frayed wire being sufficiently hard to prevent the wire from being chewed through by the critters.

11. The critter-proof bird feed apparatus of claim 10, wherein the end of the wire is configured in a loop for hanging the bird feeder and the connecting cable comprises a wire extension coupled to the loop and which extends upwards away from the bird feeder for hanging the bird feeder to a higher, more elevated, supporting structure.

12. The critter-proof bird feed apparatus of claim 7, wherein the volumetric container comprises an open conical shaped cylinder of gradually decreasing circumference from top to bottom, with a top of the volumetric container having a larger circumference than the bottom of the volumetric container that is closest to the feed dispensing tray, wherein the conical shape prevents critters from being able to grab onto an exterior surface of the bird feeder when the critters attempt to jump onto and hold on to the bird feeder.

13. A method for manufacturing a critter-proof bird feeder apparatus, the method comprising:
- providing a connecting cable capable of extending vertically above a bird feeder, with a first end proximate to and attached to a top of the bird feeder and a second end configured as a loop for attaching to a pole, bracket, or other support structure immediately above the bird feeder assembly; and
- providing a critter barrier/deflector assembly that extends along a portion of the connecting cable between the top of the bird feeder and the second end of the connecting cable, the critter barrier/deflector comprising a deflector plate that extends perpendicular to the top surface of the bird feeder housing assembly, the deflector plate having a larger circumference/width than and extending laterally past an exterior edge of the bird feeder in each lateral direction, the deflector plate blocking a view of the bird feeder from a position above the deflector plate and preventing critters from being able to gain access to the base plate and the feed within the bird feeder.

14. The method of claim 13, wherein providing the critter barrier/deflector assembly comprises:
- providing a deflector plate and attaching the deflector plate to the connecting cable such that the deflector plate extends perpendicular to the top surface of the bird feeder, the deflector plate having a larger width than and extending laterally past a width of the bird feeder in each lateral direction, the deflector plate blocking a view from above the deflector plate of the bird feeder; and
- providing a plurality of cones and attaching the plurality of cones to the connecting cable such that the cones extend above the deflector plate, each adjacent pair of cones having a lower, open portion of an upper cone overlapping a top portion of a body of a lower cone.

15. The method of claim 14, wherein providing the critter barrier/deflector assembly further comprises providing a plurality of spherical balls and attaching the plurality of spherical balls to the connecting cable such that the plurality of spherical balls extends from a topmost cone upwards to the loop of the connecting cable, the plurality of spherical balls having through holes, with a segment of the connecting cable extended there-through.

16. The method of claim 14, wherein providing the connecting cable comprises incorporating a frayed wired to at least an exposed top portion of the connecting cable, the frayed wire being of sufficient tensile strength to hold the bird feeder and attached critter barrier/deflector assembly while extended from above by the connecting cable, the frayed wire being sufficiently hard to prevent the wire from being chewed through by the critters.

17. The method of claim 13, further comprising:
- providing a bird feeder having: (i) a hollow volumetric container within which feed can be placed for dispensing, the volumetric container having an exterior wall with one or more dispensing apertures presented therein; (ii) a base plate that extends to allow one or more birds to perch thereon, the base plate or tray providing a surface for dispersing the feed from the one or more apertures; and (iii) a removable cover for exposing a hollow interior of the bird feeder to enable insertion of the feed and to securely attach to a top of the volumetric container to protect the feed from exposure to rain and other environmental elements, and from access from the top of the volumetric container;
- wherein the volumetric container comprises an open inverted conical shaped cylinder of gradually decreasing circumference from top to bottom, with a top of the volumetric container having a larger circumference than the bottom of the volumetric container that is closest to the feed dispensing tray, wherein the inverted conical shape prevents critters from being able to grab onto an exterior surface of the bird feeder housing when the critters attempt to jump onto and hold on to the bird feeder housing.

* * * * *